United States Patent
Khosravi et al.

(10) Patent No.: US 8,417,945 B2
(45) Date of Patent: Apr. 9, 2013

(54) DETECTION AND REPORTING OF VIRTUALIZATION MALWARE IN COMPUTER PROCESSOR ENVIRONMENTS

(75) Inventors: Hormuzd M. Khosravi, Portland, OR (US); David Durham, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1312 days.

(21) Appl. No.: 12/165,155

(22) Filed: Jun. 30, 2008

(65) Prior Publication Data

US 2009/0328042 A1 Dec. 31, 2009

(51) Int. Cl.
*H04L 29/06* (2006.01)

(52) U.S. Cl.
USPC .......................................................... 713/164

(58) Field of Classification Search .......... 713/164–167; 726/22–25; 714/34
See application file for complete search history.

(56) References Cited

U.S. PATENT DOCUMENTS

| | | | |
|---|---|---|---|
| 6,199,181 B1* | 3/2001 | Rechef et al. | 714/38.13 |
| 2009/0006714 A1* | 1/2009 | Durham et al. | 711/6 |
| 2010/0251255 A1* | 9/2010 | Miyamoto et al. | 718/104 |

* cited by examiner

*Primary Examiner* — Michael S McNally
*Assistant Examiner* — Daniel Hoang
(74) *Attorney, Agent, or Firm* — Garrett IP, LLC (57) ABSTRACT

Methods and systems to detect virtualization of computer system resources, such as by malware, include methods and systems to evaluate information corresponding to a computer processor operating environment, outside of or secure from the operating environment, which may include one or more of a system management mode of operation and a management controller system. Information may include processor register values. Information may be obtained from within the operating environment, such as with a host application running within the operating environment. Information may be obtained outside of the operating environment, such as from a system state map. Information obtained from within the operating environment may be compared to corresponding information obtained outside of the operating environment. Direct memory address (DMA) translation information may be used to determine whether an operating environment is remapping DMA accesses. Page tables, interrupt tables, and segmentation tables may be used to reconstruct a view of linear memory corresponding to the operating environment, which may be scanned for malware or authorized code and data.

18 Claims, 5 Drawing Sheets

DETECTION AND REPORTING OF VIRTUALIZATION MALWARE IN COMPUTER PROCESSOR ENVIRONMENTS

BACKGROUND

Computer processor systems may be configured to virtualize underlying host physical resources and to arbitrate access to the resources by one or more guest operating systems.

Virtualization features, including hardware implemented virtualization features, may be initiated or compromised by conflicting or incorrect versions of drivers or applications, or by malicious code, such as hyper-jacking code, virtualizing root-kits, and other malware.

Heuristic-based evaluations, such as evaluations of translation look-aside buffer behavior and timing inconsistencies, may not provide sufficiently accurate indications of virtualization or malware.

Detection processes running within an operating environment, such as anti-virus programs, may be vulnerable to attack, modification, or circumvention by malware. For example, malware may utilize virtualization features to virtualize operating system components including anti-virus software running therein.

BRIEF DESCRIPTION OF THE DRAWINGS/FIGURES

In the drawings, the leftmost digit(s) of a reference number identifies the drawing in which the reference number first appears.

DETAILED DESCRIPTION

Disclosed herein are methods and systems to evaluate information corresponding to a computer processor operating environment outside of, or secure from the operating environment. The information may be evaluated to identify one or more of improper and malicious code, such as hyper-jacking code, virtualizing root-kits, and other malware.

Figure 1:
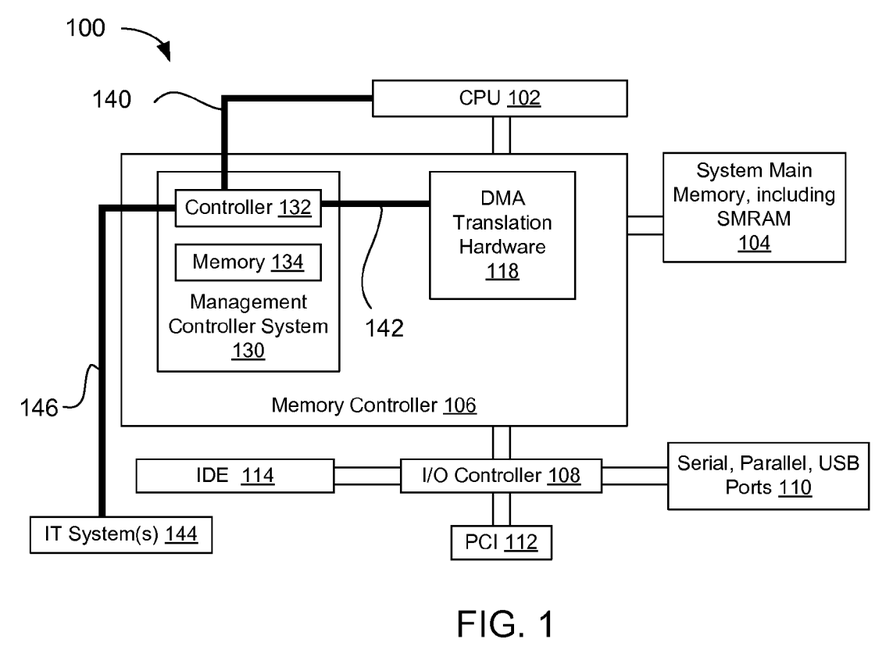
FIG. 1 is a block diagram of an exemplary computer processor environment.

FIG. 1 is a block diagram of an exemplary computer processor environment 100, including one or more central processing units, illustrated here as CPU 102, to execute computer program product logic, also referred to herein as instructions, logic, and software.

Computer processor environment 100 includes system main memory 104, which includes a computer readable medium to store computer readable instructions to cause CPU 102 to perform one or more functions in response thereto. Exemplary instructions are described below with reference to FIG. 2.

Computer processor environment 100 includes a memory controller 106 to interface between memory 104 and other devices. Memory controller 106 may include a graphics controller.

Computer processor environment 100 includes an input/output (I/O) controller 108 to interface between computer processor environment 100 and one or more I/O devices through one or more of serial, parallel, and USB ports 110, peripheral component interface (PCI) 112, and integrated drive electronics (IDE) interface 114.

Computer processor environment 100 may be configured to permit direct memory access (DMA) to memory 104 by one or more I/O devices. Computer processor environment 100 may include DMA address translation or remapping hardware 118 to support translations of DMA requests, and/or to enforce memory access protections, as described further below.

Computer processor environment 100 may include a management controller system 130 to perform one or more management functions with respect to computer processor environment 100. Management controller system 130 may include an instruction processor, illustrated here as a controller 132, which may be a microcontroller, and memory 134 having a computer readable medium to store computer readable instructions to cause controller 132 to perform one or more management functions in response thereto. Exemplary instructions are described below with reference to FIG. 3. Memory 134 may include firmware that is secure from operating environments of CPU 102.

Computer processor environment 100 may include a communication link 140 between controller 132 and CPU 102, to communicate with CPU 102. Link 140 may be configured to permit controller 132 and CPU 102 to communicate during one or more of a system management mode of CPU 102 and operating environments of CPU 102.

Computer processor environment 100 may include a communication link 142 between controller 132 and memory 104 to directly access memory 104. Link 142 may pass through one or more of I/O controller 108, memory controller 106, and DMA translation hardware 118.

Computer processor environment 100 may include a communication link 146 between controller 132 and one or more information technology (IT) systems 144. IT systems 144 may include one or more of a network administrator, a back-end server, and other infrastructure devices. Controller 132 may be configured to send reports or alerts over link 146, and may be configured to receive information over link 146, which may include one or more of instructions and updates. Link 146 may be isolated, or secure from CPU 102 and operating environment of CPU 102, such that link 146 is not interruptible by malware running on CPU 102. Such a communication link is referred to herein as an out-of-band (OOB) communication link. Management controller system 130 may be configured to store alerts when communication link 146 is disabled, and report the stored alerts when connectivity is restored. One or more IT systems 144 may be physically and/or geographically remote with respect to other portions of computer processor environment 100.

Isolation, security, and access privileges described herein may be implemented with hardware, software, firmware, and combinations thereof.

Computer processor environment 100, or portions thereof, may be implemented on a common integrated circuit (IC)

chip or over multiple IC chips mounted on a common circuit board or over multiple circuit boards.

Figure 2:
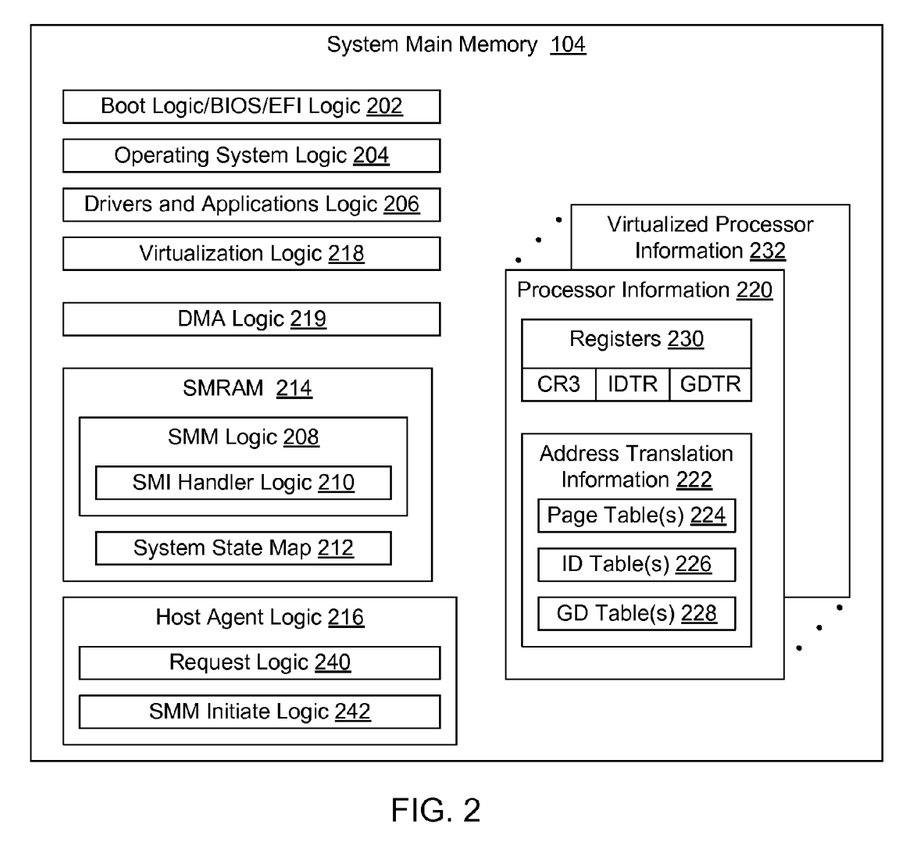
FIG. 2 is a block diagram of exemplary memory instruction modules within memory associated with a central processing unit of the computer processor environment.

FIG. 2 is an exemplary block diagram of memory 104, including instructions, or logic, to control CPU 102, and data for use by CPU 102, under control of the logic.

Memory 104 may include boot logic 202, or basic input/output system (BIOS) logic, which may include extensible firmware interface (EFI) logic, to initialize computer processor environment 100 following a reboot or reset.

Memory 104 may include operating system logic 204, corresponding to one or more operating systems, to cause CPU 102 to provide one or more corresponding operating environments for driver and applications programs.

Memory 104 may include drivers and applications logic 206 to cause CPU 102 to perform various functions within one or more operating environments.

Memory 104 may include system management mode (SMM) logic 208 to cause CPU 102 to operate in a system management mode, outside of an operating environment, and to perform one or more management functions in system management mode.

SMM logic 208 may be initiated upon a hardware interrupt to CPU 102. SMM logic 208 may include system management interrupt (SMI) handler logic 210 to cause CPU 102 to perform management different functions in response to different interrupts and/or in response to instructions and/or data provided with an interrupt.

SMI handler logic 210 may include logic to cause CPU 102 to store a processor context as a system state map 212 upon an interrupt. System state map 212 may include processor information, such as processor register values, as described below.

SMM logic 208 may be implemented in firmware, and may be loaded or initiated by boot logic 202 upon an interrupt. SMM logic 208 and system state map 212 may be stored in memory that is access protected with respect to operating environments, and accessible within system management mode, as described below. In the example of FIG. 2, such a protected region of memory 104 is illustrated as system management random access memory (SMRAM) memory 214.

Memory 104 may include host agent logic 216, as described below with respect to FIG. 4.

Memory 104 may include virtualization logic 218 to provide a virtualized environment for one or more operating environments. Virtualization logic 218 may include logic to initiate a virtual machine monitor (VMM) to arbitrate access to underlying host physical computer processor resources by one or more guest operating systems. The VMM may present guest software, such as guest operating system(s) and application software, with an abstraction of underlying physical resources. A guest operating system and corresponding virtual resources and interfaces are referred to herein as a virtual machine (VM).

VMM logic 218 may include logic to cause CPU 102 to assign an I/O device to a VM, and to assign a portion of memory 104 to the VM or to the I/O device, such as for direct memory access by the I/O device.

Memory 104 may include direct memory access (DMA) logic 219, in conjunction with DMA translation hardware 118 in FIG. 1, to translate or remap DMA requests, such as between guest physical addresses (GPAs) provided by guest operating system device drivers to I/O devices, and host physical addresses (HPAs) of memory 104. DMA logic 219 may include logic to cause CPU 102 to configure DMA translation tables and store them in memory 104 for use by DMA translation hardware 118.

DMA logic 219 and DMA translation hardware 118 may include logic to enforce memory protection domains. When a device attempts to access memory 104, DMA translation hardware 118 may look up the address translation tables in memory 104 to identify a protection domain corresponding to the device. If the physical memory location is outside of the protection domain, the DMA translation logic 118 may deny access and may report a fault to system software.

Memory 104 may include interrupt translation logic to translate device interrupt requests to a physical interrupts. Interrupt translation logic may include hardware and a software-programmed interrupt translation table structure.

In a non-VMM, or native operating system environment, an operating system may be configured to maintain translations between HPAs and linear addresses of the operating environment, such as with page tables, as is well known. For example, in FIG. 2, memory 104 includes processor information 220, which includes address translation information 222, illustrated here as page tables 224, interrupt descriptor tables 226, and segmentation or global descriptor tables 228, as are well known. Memory 104 may include one or more processor registers 230 to store pointers to memory locations corresponding to address translation information 222. Processor registers 230 may include a control or CR3 register for page tables 224, an IDT register for interrupt descriptor tables 226, and a GDT register for global descriptor tables 228, as are well known.

In a virtualized environment, a VMM may be configured to maintain page tables and related information to translate between the HPAs of memory 104 and GPAs corresponding to one or more virtualized guest operating environments. Such information may be represented as processor information 220 in FIG. 2. Guest operating environments may be configured to maintain page tables to map between the GPAs and guest linear addresses of the guest operating environments. Such information may be referred to as virtualized processor information, and may be represented as virtualized processor information 232 in FIG. 2.

Figure 4:
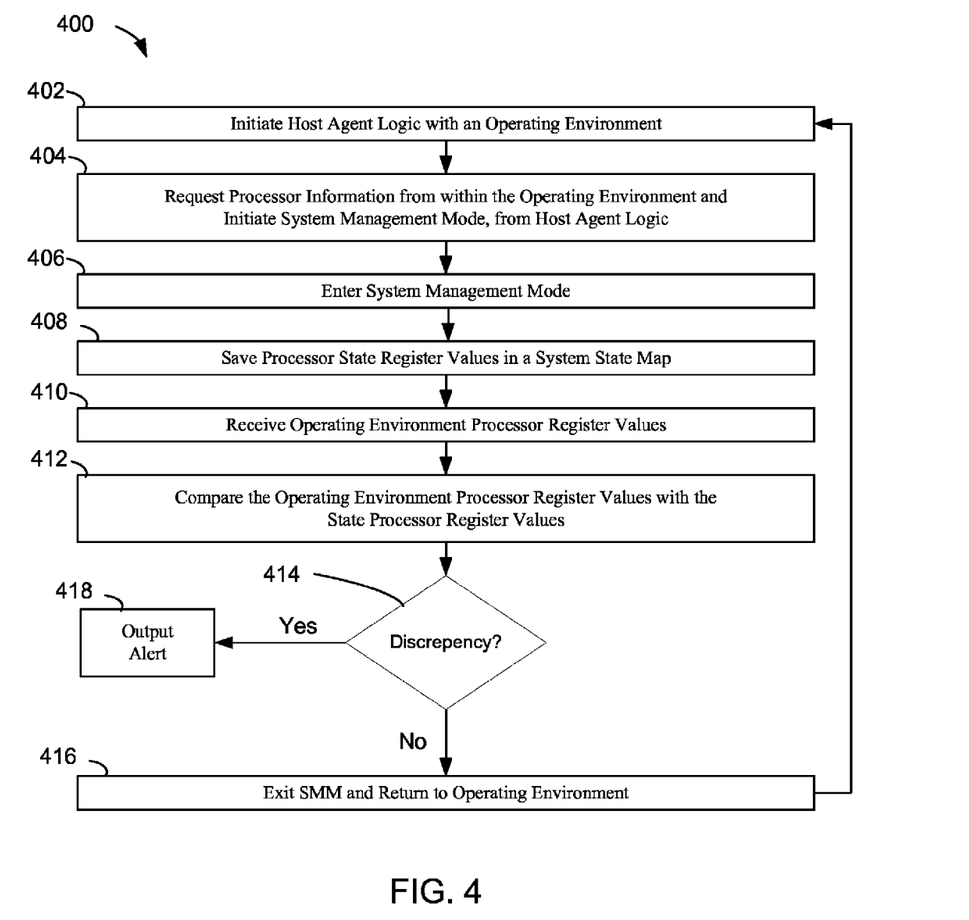
FIG. 4 is a process flowchart of an exemplary method of determining whether an operating environment has been virtualized, such as by malware.

FIG. 4 is a process flowchart of an exemplary method 400 of obtaining processor information from an operating environment and determining from the information, and outside of the operating environment, whether the operating environment has been virtualized, such as by malware. Method 400 is described below with reference to FIGS. 1 and 2, for illustrative purposes. Method 400 is not, however, limited to the examples of FIGS. 1 and 2.

At 402, host agent logic within an operating environment is initiated. The host agent logic may be initiated by one or more of operating system instructions and assembly instructions. The host agent logic may be initiated repeatedly over time, periodically or non-periodically. In FIG. 2, host agent logic 216 may be configured to run within an operating environment of CPU 102.

At 404, the host agent logic requests processor information, including processor register values, and initiates system management mode. The host agent logic may include operating system application program interface (API) or assembly instructions to request the processor information.

In FIG. 2, host agent logic 216 includes request logic 240 to cause CPU 102 to provide the processor register values from within the operating environment. The processor register values may include one or more of page table register values, global descriptor table register values, and interrupt descriptor table register values. When the operating environment is not virtualized, the operating environment processor register values correspond to processor information 220. When the operating environment is virtualized, the operating environment processor register values correspond to virtualized processor information 232.

Host agent logic 216 also includes SMM initiate logic 242 to cause CPU 102 to perform a function that triggers a hardware interrupt of CPU 102. For example, SMM initiate logic 242 may include logic to cause CPU 102 to access a particular register, which may be an I/O register, or other memory location, which triggers a hardware interrupt. CPU 102 may be configured to suspend the operating environment upon the interrupt and to initiate SMM logic 208.

SMM initiate logic 242 may include logic to cause CPU 102 to provide the operating environment processor register values to system management mode.

At 406, the processor system enters or initiates system management mode.

In FIG. 2, SMM logic 208 may include system management interrupt (SMI) handler logic 210, which may include SMI handler logic associated with the host agent.

At 408, a system state map is saved. In FIG. 2, SMM logic 208 or SMI handler logic associated with the host agent may include logic to cause CPU 102 to store system state map 212. The system state map includes state processor register values, represented by processor information 220 in FIG. 2.

At 410, the operating environment processor register values requested at 404 are received in system management mode.

At 412, the operating environment processor register values are compared to the state processor register values. In FIG. 2, SMI handler logic 210 may include logic to cause CPU 102 to compare the processor register values provided from within the operating environment to the state processor register values. A discrepancy between processor register values provided from within the operating environment and the state processor register values may indicate virtualization of the operating environment.

Upon a discrepancy between the state processor register values and the operating environment processor register values at 414, an alert is output at 418.

In FIG. 2, SMI handler logic 210 may include alert logic to cause CPU 102 to output an alert. CPU 102 may output the alert to management controller system 130, over link 140, which may output the alert to one or more IT systems 144 over OOB link 146.

When there is no substantial discrepancy at 414, system management mode may be exited and processing may return to 402. Method 400 may be repeated at a later time, periodically or non-periodically.

In the example above, the comparing is described as performed by CPU 102 in system management mode. Alternatively, SMI handler logic 210 may include logic to cause CPU 102 to output the state processor register values and the operating environment processor register values to management controller system 130, which may include logic to perform the comparing.

Figure 5:
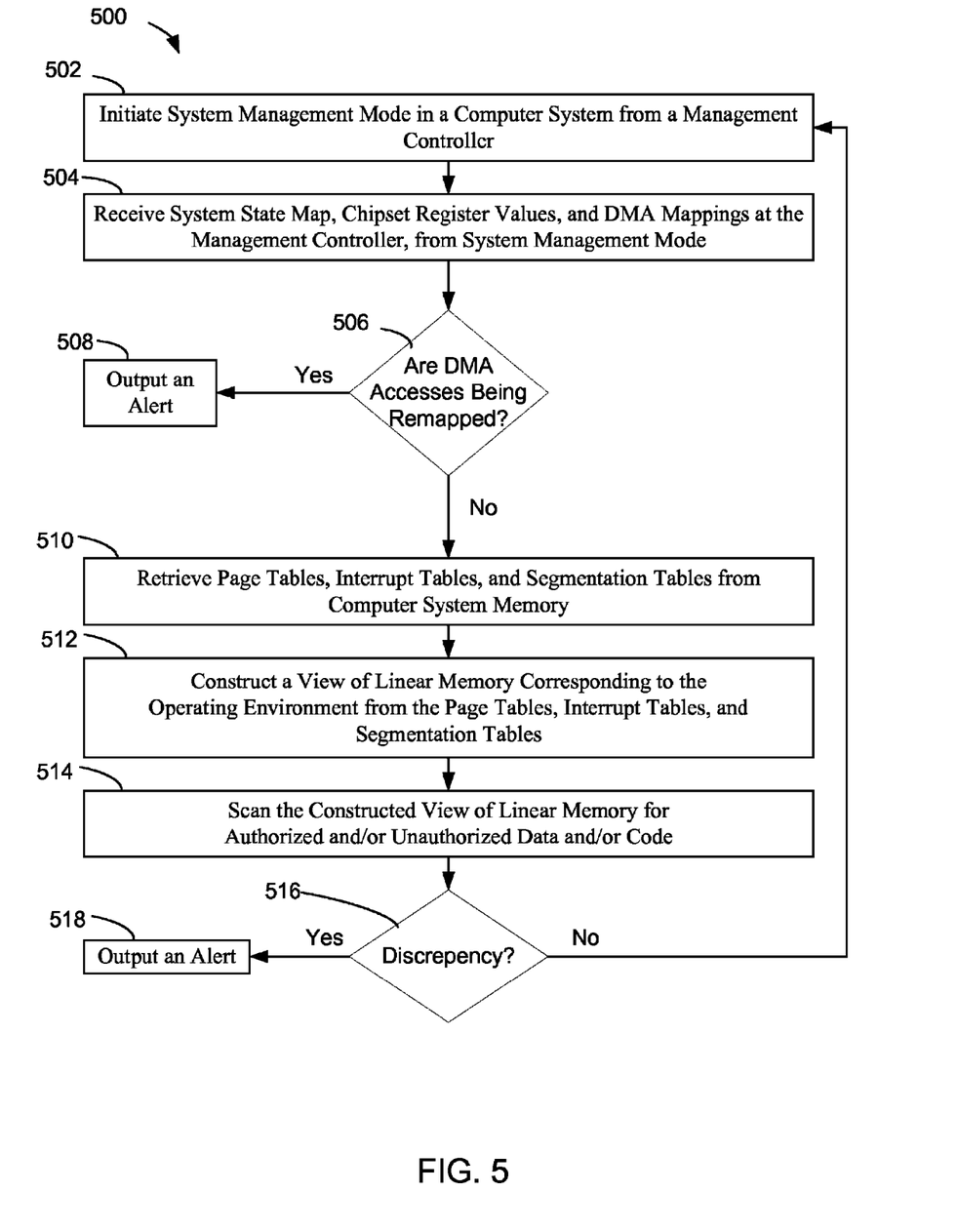
FIG. 5 is a process flowchart of another exemplary method of determining whether an operating environment has been virtualized, such as by malware.

FIG. 5 is a process flowchart of an exemplary method 500 of examining DMA translation information of an operating environment to determine whether DMA translations are being remapped, and of constructing and scanning a linear view of memory corresponding to the operating environment to detect one or more of authorized and unauthorized data and/or code. Method 500, or portions thereof, may be implemented alone or in combination with method 400. Method 500 is described below with reference to FIGS. 1-3, for illustrative purposes. Method 500 is not, however, limited to the examples of FIGS. 1-3.

In FIG. 5, at 502, system management mode is initiated on a computer system by a management controller system.

Figure 3:
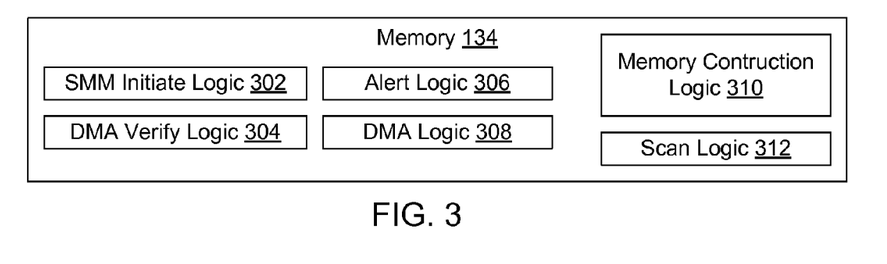
FIG. 3 is a block diagram of exemplary memory instruction modules within memory associated with a management controller system of the computer processor environment.

In FIG. 3, memory 134 includes SMM initiate logic 302 to cause controller 132 to initiate system management mode on CPU 102. SMM initiate logic 302 may include logic to cause controller 132 to send a management type query to CPU 102, to cause CPU 102 to interrupt the operating environment and to initiate SMM logic 208.

At 504, the management controller receives a system state map, chipset register values, and DMA mappings from the system management mode.

In FIG. 3, SMM logic 208 may include query handler logic to respond to the management type query. The query handler logic may include logic to cause CPU 102 to store a system state map as described above at 406.

The query handler logic may include logic to cause CPU 102 to retrieve the system state map, and to retrieve chipset register data related to DMA mappings and memory contents for DMA mappings from memory 104. The query handler logic may include logic to examine chipset registers and memory locations responsible for remapping DMA regions accessed by management controller system 130 to directly scan memory 104.

The query handler logic may include logic to send the information to management controller system 130. The information may be sent to management controller system 130 over a confidential/secure channel that can only be utilized when the host is in SMM mode. The query handler logic may include logic to cause CPU 102 to exit system management mode after sending the information to management controller 120.

At 506, the management controller determines whether DMA accesses are being remapped. The management controller may determine whether DMA accesses of the management controller or other I/O device are being remapped. The management controller may compare a system management mode view of memory with a management controller view of the memory. The management controller may determine whether the DMA remapping for management controller system 130 maps all of memory 104, other than SMRAM 214 where system SMM logic 208 resides.

In FIG. 3, memory 134 may include DMA verify logic 304 to cause controller 132 to determine whether DMA requests are being remapped in the operating environment of CPU 102.

When the management controller determines whether DMA accesses are being remapped, an alert is output at 508.

If no remapping is detected at 506, processing may proceed to 510, where the management controller retrieves page tables, interrupt tables, and segmentation tables from memory of the computer system memory. The management controller may analyze processor register contents, such as a CR3, IDTR, and GDTR, in FIG. 2, to determine physical memory locations of the page tables, interrupt descriptor tables, and segmentation tables.

At 512, the management controller constructs a view of linear memory corresponding to the operating environment of the computer system, from the page tables, interrupt tables, and segmentation tables. When the operating environment is a virtualized environment, the constructed view of linear memory may correspond to a virtual view of linear memory.

In FIG. 3, memory 134 may include memory construction logic 310 to cause controller 132 to construct the view of memory.

At 514, memory associated with the computer system, corresponding to the constructed view of linear memory, is scanned by the management controller.

The management controller may scan physical memory to identify one or more of an operating system image, interrupt handlers/drivers, and other authorized or expected structures. If the code and data present on the system does not match an authorized or expected image, the management controller may signal a network administrator at 518, via a OOB network channel, such as link 146 in FIG. 1.

The management controller may scan virtual/linear memory for known malware signatures provided by a network administrator or other trusted network service and, if found, report the existence and location in memory to a network administrator at 518.

In FIG. 3, memory 134 may include DMA logic 310 to cause controller 132 to directly access memory 104 over link 142, and scan logic 312 to cause controller 132 to scan the constructed view of linear memory.

Method 500 may be repeated periodically or non-periodically.

Information and/or values obtained during method 500 may be saved and compared to corresponding information and/or values obtained during subsequent iterations of method 500.

Figure 6:
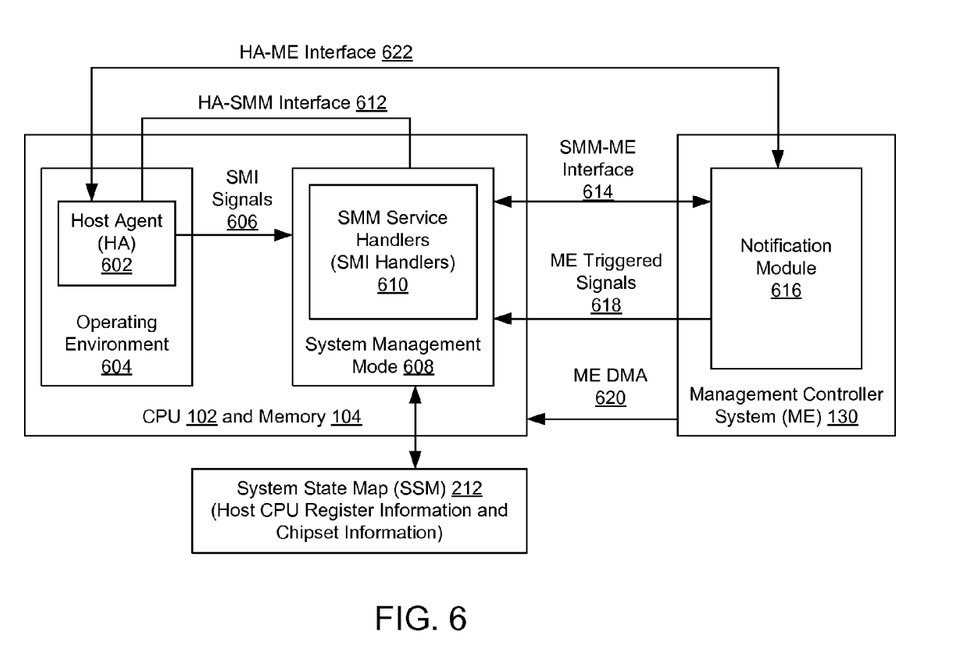
FIG. 6 is a graphical illustration of exemplary information flow within a computer processor environment.

FIG. 6 is a graphical illustration of exemplary information flow within a computer processor environment 100, corresponding to features described above. A host agent (HA) 602, initiated within an operating environment 604, sends SMI signals 606 to a system management mode 608, to invoke a host agent interrupt handler within SMI handlers 610. Host agent 602 provides processor register values from operating environment 604 to the host agent interrupt handler as illustrated by HA-SMM interface 612.

Management controller system 130 receives information and/or alerts from system management mode 608 over SMM-ME interface 614. Management controller system 130 includes a notification module 616 to send alerts over an OOB channel.

Management controller system 130 sends management engine (ME) triggered signals 618, such as management type queries, to system management mode 608, to initiate a query type service handler within SMI handlers 610. Management controller system 130 sends DMA requests 620 to memory 104.

CPU 102 may be configured with hardware to store an indication when virtualization logic 118 or DMA logic 119 been initiated on CPU 102. Management controller 132 may be configured to directly query CPU 102 for the indication over a secure link, such as a hardware-based link, independent of SMM logic 208.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof. One or more functions described herein as implemented with software, may be implemented, in whole or in part, in hardware-based logic.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   requesting processor register values from within an operating environment of a computer system;
   initiating a suspension of the operating environment from within the operating environment;
   storing a system state map including state processor register values corresponding to a state of the computer system upon suspension of the operating environment;
   comparing the processor register values provided from within the operating environment to the state processor register values; and
   outputting an alert upon a discrepancy between the processor register values provided from within the operating environment and the state processor register values.

2. The method of claim 1, wherein the processor register values include one or more of page table register values, global descriptor table register values, and interrupt descriptor table register values.

3. The method of claim 1, further comprising, initiating host logic within the operating environment, wherein host logic causes the computer system to perform the requesting and the initiating within the operating environment, and causes the computer system to initiate system management mode logic upon the suspension of the operating environment, wherein the system management mode logic causes the computer system to perform the comparing and the outputting.

4. The method of claim 1, further comprising, initiating host logic within the operating environment, wherein host logic causes the computer system to perform the requesting and the initiating, and causes the computer system to initiate system management mode logic upon the suspension of the operating environment, wherein the system management mode logic causes the computer system to send the processor register values provided from within the operating environment and the state processor register values to a management controller system, wherein the management controller system performs the comparing and the outputting.

5. The method of claim 1, further comprising:
   sending a management query to the computer system from a management controller system;
   suspending an operating environment of the computer system and initiating a system management mode of the computer system in response to the management query;
   retrieving a system state map, chipset register values, and direct memory mappings from memory of the computer system, in the system management mode;
   sending the system state map, chipset register values, and direct memory mappings to the management controller system;
   determining, in the management controller system, whether the computer system is remapping direct memory access requests of the management controller system, from the system state map, chipset register values, and direct memory mappings; and
   outputting an alert upon a determination that the computer system is remapping direct memory access requests of the management controller system, over a communication link that is access protected from the operating environment.

6. The method of claim 5, wherein the determining includes comparing a system management mode view of the computer system memory with a management controller system view of the computer system memory.

7. The method of claim 5, further comprising:
retrieving page tables, interrupt tables, and segmentation tables from the computer system memory;
constructing a view of linear memory corresponding to the operating environment from the page tables, interrupt tables, and segmentation tables;
scanning the view of linear memory for an indication of one or more of authorized and unauthorized logic and information; and
outputting an alert upon an identification of one or more of unauthorized logic and data, over the communication link that is outside of the operating environment;
wherein the retrieving, the constructing, the scanning, and the outputting is performed by the management controller system.

8. The method of claim 7, wherein the scanning includes scanning at least a portion of the computer system memory for an image associated with one or more of an operating system, an interrupt handler, a driver, and malicious code.

9. A computer program product including non-transitory computer readable media having computer program product logic stored therein, the computer program product logic including:
host agent logic to cause a computer system to provide processor register values from within an operating environment of the computer system, and to cause the computer system to suspend the operating environment; and
system management mode logic to cause the computer system to store state processor register values corresponding to a state of the computer system upon suspension of the operating environment, to compare the processor register values provided from within the operating environment to the state processor register values, and to output an alert upon a discrepancy;
wherein the host agent logic further includes logic to cause the computer system to initiate the system management mode logic upon suspension of the operating environment.

10. The computer program product logic of claim 9, wherein the processor register values include one or more of page table register values, global descriptor table register values, and interrupt descriptor table register values.

11. The computer program product logic of claim 9, wherein the computer system is configured to suspend the operating environment and to initiate the system management mode logic upon receipt of a management query from a management controller, and wherein the system management mode logic includes logic to cause the computer system to retrieve and output the system state map, chipset register values, and direct memory mappings, to the management controller in response to the management query, the computer program product logic further comprising management controller logic, including:
query logic to cause a management controller to send the management query to the computer system;
direct memory access verify logic to cause the management controller to determine from the system state map, chipset register values, and direct memory mappings, whether the computer system is remapping direct memory access requests of the management controller; and
alert logic to cause the management controller to generate an alert when a determination is made that the computer system is remapping direct memory access requests of the management controller system.

12. The computer program product logic of claim 11, wherein the direct memory access verify logic includes logic to cause the management controller to compare a system management mode view of a computer system memory with a management controller system view of the computer system memory.

13. The computer program product logic of claim 11, wherein the management controller logic further comprises:
memory construction logic to cause the management controller to construct a view of linear memory corresponding to the operating environment from page tables, interrupt tables, and segmentation tables retrieved from a computer system memory;
scan logic to cause the management controller to scan the view of linear memory for an indication of one or more of authorized and unauthorized logic and information; and
alert logic to cause the management controller to generate an alert upon a scanning discrepancy.

14. The computer program product logic of claim 13, wherein the scan logic includes logic to cause the management controller to scan at least a portion of the computer system memory for an image associated with one or more of an operating system, an interrupt handler, a driver, and malicious code.

15. A system, comprising:
a computer processor;
a memory controller coupled to the computer processor;
processor memory coupled to the memory controller and including a computer program product including computer readable media having computer program product logic stored therein;
an input/output controller coupled to the memory controller;
direct memory access hardware logic coupled between the input/output controller and the memory;
wherein the processor memory includes,
operating system logic corresponding to one or more operating systems to cause the computer processor to provide one or more corresponding operating environments; and
virtualization logic to cause the computer processor to provide a virtual interface between one or more physical resources and the operating system logic;
host agent logic to cause the computer processor to provide processor register values from within an operating environment of the computer system, and to cause the computer system to suspend the operating environment, and
system management mode logic to cause the computer processor to store state processor register values corresponding to a state of the computer system upon suspension of the operating environment, to compare the processor register values provided from within the operating environment to the state processor register values, and to output an alert upon a discrepancy,
wherein the host agent logic further includes logic to cause the computer processor to initiate the system management mode logic upon suspension of the operating environment.

16. The system of claim 15, wherein the processor register values include one or more of page table register values, global descriptor table register values, and interrupt descriptor table register values.

17. The system of claim 15, further comprising:
a management controller system coupled to the computer processor and the direct memory access hardware logic, the management controller system including a management controller and management controller memory, the management controller memory including a computer program product including computer readable media having computer program product logic stored therein; and an out-of-band communication link coupled to the management controller to communicate between the management controller system and one or more external systems;

wherein the computer processor is configured to suspend an operating environment and initiate the system management mode logic upon receipt of a management query from the management controller;

wherein the system management mode logic includes logic to cause the computer processor to output a system state map, chipset register values, and direct memory mappings to the management controller in response to the management query from the management controller;

wherein the management controller memory includes,
query logic to cause the management controller to send the management query to the computer system,
direct memory access verify logic to cause the management controller to determine from the system state map, chipset register values, and direct memory mappings, whether the computer processor is remapping direct memory access requests of the management controller, and
alert logic to cause the management controller to generate an alert when a determination is made that the computer system is remapping direct memory access requests of the management controller.

18. The system of claim 17, management controller memory further includes:
memory construction logic to cause the management controller to construct a view of linear memory corresponding to the operating environment from page tables, interrupt tables, and segmentation tables retrieved from the processor memory,
scan logic to cause the management controller to scan the view of linear memory for an indication of one or more of authorized and unauthorized logic and information, and
alert logic to cause the management controller to generate an alert upon a scanning discrepancy.

* * * * *